(12) United States Patent
Rogers

(10) Patent No.: US 7,520,084 B2
(45) Date of Patent: Apr. 21, 2009

(54) SPEAR GUN TIP ASSEMBLY

(76) Inventor: William H. Rogers, 8315 Kindred Spirit La., St. Augustine, FL (US) 32092

( * ) Notice: Subject to any disclaimer, the term of this patent is extended or adjusted under 35 U.S.C. 154(b) by 280 days.

(21) Appl. No.: 11/180,178

(22) Filed: Jul. 13, 2005

(65) Prior Publication Data

US 2006/0042144 A1    Mar. 2, 2006

Related U.S. Application Data

(63) Continuation-in-part of application No. 10/924,356, filed on Aug. 24, 2004.

(51) Int. Cl.
  *A01K 81/00* (2006.01)
  *A01K 81/04* (2006.01)
  *A01K 81/06* (2006.01)
(52) U.S. Cl. .......................................... 43/6
(58) Field of Classification Search .................. 43/5, 43/6; 42/1.14; 89/5; 294/61, 66.1, 126
See application file for complete search history.

(56) References Cited

U.S. PATENT DOCUMENTS 2,796,691 A * 6/1957 Norris ............................ 43/6
2,923,285 A * 2/1960 Salles .......................... 124/63
3,050,897 A * 8/1962 Pitts ............................... 43/6
4,624,068 A * 11/1986 Howard, III .................. 43/6
4,896,450 A * 1/1990 Rogers ........................... 43/6
6,055,761 A * 5/2000 Chaprales ....................... 43/6

* cited by examiner

*Primary Examiner*—David J. Parsley
(74) *Attorney, Agent, or Firm*—Arthur G. Yeager

(57) ABSTRACT

A spear assembly for an underwater spear gun has an elongate shaft adapted to be fired from a spear gun and has a long axis, a forward portion, and a rearward portion. A tip member includes having front and rear portions with the tip member being removably attached to the forward portion of the shaft. An elongated cable has a forward end attached to the tip and a rearward portion attached to rearward portion of the shaft. Two barbs are included to improve operation of the spear. A rotatable rear cable restraint impedes movement of the cable and the tip member until the spear is fired from a spear gun. Another restraint means is also used for releasably securing the forward end of the cable to the tip member at a medial portion thereof. The assembly can also be used with pole spears and Hawaiian slings.

18 Claims, 1 Drawing Sheet

SPEAR GUN TIP ASSEMBLY

CROSS-REFERENCE TO RELATED APPLICATION

This application is a continuation-in-part of an application entitled "SPEAR GUN TIP ASSEMBLY", Ser. No. 10/924,356, filed Aug. 24, 2004.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to a tip assembly for underwater spear fishing devices and particularly to removable assemblies for use with spear guns.

2. Relevant Art

A wide variety of spears exist for use in underwater fishing. When the spear pierces the fish, the fish usually flips and turns through violent contortions to free itself of the spear. Unless the spear tip is fashioned with devices to prevent it from being retracted from the fish, the spear may be shaken loose by the contortions of the fish and the catch is lost. Spear tips of the prior art include some type of barb which was broader at its base than near the point so that reverse movement of the barb is inhibited.

Generally speaking, many spears employ a removable tip which is connected to a main spear shaft by a cable. What is desired is a tip assembly and cable connection that impedes accidental release of the tip and employs a minimum number of components. In addition, two barbs are desired to enhance tip assembly release.

BRIEF SUMMARY OF THE INVENTION

In one aspect of the present invention there is provided a spear assembly for an underwater spear gun or fishing device having an elongated shaft adapted to be fired from a spear fishing device and having a long axis, a forward portion, and a rearward portion, and a tip member having front and rear portions. The tip member is removably attached to the forward portion of the shaft. An elongated flexible cable with a forward end is attached to the tip member and a rearward portion is attached to rearward portion of the shaft and a barb including a barb body is attached to the tip member adjacent the rear portion of the tip member and has a rearwardly directed barb point rear cable restraint means on the shaft. The rear cable restraint means is rotatable to one position for impeding movement of the cable and the tip member until the spear is fired from a spear gun or other spear fishing device. The rear cable restraint means includes a retainer flange carried by the shaft and having a passageway therethrough for carrying the cable therein. A cable retainer ring includes a slot formed therein. A resilient O-ring is carried by the retainer ring, a portion of which is positioned over the slot and being movable downwardly. A portion of the cable is threaded through the passageway in the retainer flange and over the O-ring. A slot is rotatably positionable with respect to the cable threaded through the passageway to a first relative position wherein the cable portion is overlaying a portion of the O-ring over the slot to allow for downward movement of the portion of the cable to allow free movement of the cable and a second relative position wherein the cable portion is overlying a portion of the O-ring over the retainer ring spaced away from the slot for engagement of the portion of the cable to inhibit the tip member from disengaging from the shaft prior to firing the shaft by a device. The cable restraint means is rotatable to another position to allow movement of the cable and the tip member without firing the spear from a device. The tip member includes a rear portion releasably attachable to the forward portion of the shaft, a front portion having a sharpened tip, and a medial portion, the forward end portion of the cable being attached to the medial portion of the tip member. The barb body is removably attached to the rear portion of the tip member. The forward end of the cable includes a sleeve member affixed to the cable and another barb member carried by the sleeve member. Another barb member is positioned 180° away from the barb. The barb point is directed downwardly for engaging a far side of a speared fish to effect relative movement between a fish and the shaft to forcibly release the tip member from the shaft.

In another aspect of the present invention there is provided a spear assembly for an underwater spear gun comprising an elongated shaft adapted to be fired from a spear gun or other device and having a long axis, a forward portion, and a rearward portion, and a sharpened elongate tip member having front and rear portions. The tip member is releasably attached to the forward portion of the shaft. An elongated flexible cable with a forward end is attached to the tip member and a rearward portion is attached to rearward portion of the shaft. A pair of barbs includes one having a rearwardly directed arcuate point and a body attached to the tip member and another including a sleeve member affixed to the forward end of the cable and a predetermined length of another cable being carried by the sleeve. A rear cable restraint means impedes movement of the cable and the tip member until the spear is fired which includes a resilient O-ring in engagement with a portion of the cable. There is includes cable restraint means for releasably securing the forward end of the cable to the tip member. The cable restraint means includes a long channel disposed in the body of one barb for retaining a portion of the cable channel therein, the channel being parallel to the long axis. One barb and body are integral and are removably attached adjacent the rear portion of the tip member.

In a further aspect of the present invention there is provided in a spear assembly for an underwater spear firing device having an elongated shaft adapted to be fired from a spear gun and having a long axis, a forward portion, and a rearward portion, and a tip member having front and rear portions is removably attached to the forward portion of the shaft. An elongated flexible cable with a forward end is attached to the tip member and a rearward portion is attached to the rearward portion of the shaft and a barb including a barb body is attached to the tip member adjacent the rear portion of the tip member and has a rearwardly directed barb point. Rear cable restraint means impedes movement of the cable and the tip member until the spear is fired from a spear device which includes a retainer flange carried by the shaft and has a passageway therethrough for carrying the cable therein, a cable retainer ring including a slot formed therein and a resilient O-ring carried by the retainer ring, a portion of which is positioned over the slot and is movable downwardly. A portion of the cable is threaded through the passageway in the retainer flange and over the O-ring. One slot is rotatably positionable with respect to the cable threaded through the passageway to a first relative position wherein the cable portion is overlaying a portion of the O-ring over the slot to allow for downward movement of the portion of the cable and a second relative position wherein the cable portion is overlying a portion of the O-ring over the retainer ring spaced away from the slot for engagement of the portion of the cable to inhibit the tip member from disengaging from the shaft prior to firing the shaft by a device. There is also securing means for attaching the barb to the rear end portion of the tip member, the securing means including a body surrounding the rear portion and carrying the barb at a predetermined location thereon. The body includes a channel disposed about 180° from one predetermined location of the barb being elongate extending substantially parallel to the long axis of the shaft and adapted to receive a portion of the cable therein and maintained therein until a speared fish exerts a force on the barb thereby releasing the portion of the cable from the groove. The barb has a first position with a rearwardly directed arcuate point and a second portion approximately 180° opposed from a first portion and includes a channel parallel to the long axis of the shaft for carrying a portion of the cable to reduce a drag profile of the cable. The second restraint means includes a collar mounted around the shaft, the collar having a passageway therethrough for carrying the cable to reduce a drag profile of the cable. The forward end of the cable includes a sleeve member affixed to the cable and a second barb member carried by the sleeve member.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention provides for several improvements over the spear gun tip assembly disclosed in U.S. Pat. No. 4,896,450 and the pending application Ser. No. 10/924,356 of applicant herein. It is important to understand that the improvements are adaptable to a wide variety of spears having a removable tip assembly. The improvements are more specifically discussed below.

In accord with the pending application, the tip is inhibited from deploying accidentally without the need for kinking of the cable connected between the tip and the rearward portion of the spear shaft. This feature is accomplished by providing a spring-biased knurled cable retainer ring on the rearward portion of the shaft adjacent a retainer flange. The retainer ring has a slot machined circumferentially for a neoprene O-ring. The O-ring is mounted adjacent a passageway in the retainer flange through which the cable passes. The spring-biased O-ring provides sufficient resistance to the movement of the cable to prevent the tip from slipping off the shaft, as by gravity, when the unit is pointed downward. The O-ring prevents premature deployment of the tip but still provides a smooth and predictable release of the tip when the fish has been speared and the barb engages the fish. It is advantageous to eliminate the spring-biasing apparatus to lower the number of components used and to provide for easier operation of the cable release means and enhance the reliability of the assembly in use.

The barb according to the improvements employed herein is preferably formed as a substantially rigid nylon tip barb element. The barb ensures a positive release even in soft tissue and enhances the toggle action of the tip.

Figure 1:
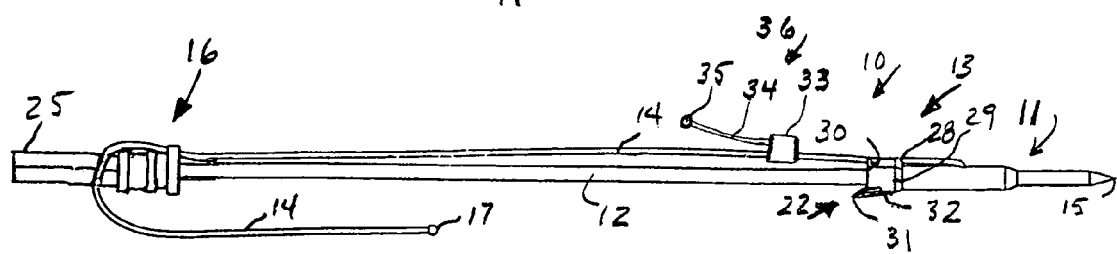
FIG. 1 is a side elevational view of the spear gun spear in accord with the present invention.

With respect now to the drawings, a spear gun spear employing the improved tip assembly of the present invention is illustrated at numeral 10 in FIG. 1. The releasable tip member 11 is releasably mounted to shaft 12 via coupler 13 which may be a conventional socket arrangement to receive the end of shaft 12 or any other appropriate apparatus.

Cable 14 is connected between the forward tip member 11 having point 15 and a rearward cable restraint means, shown generally at 16. Ball 17 on one end of the cable 14 limits the separation between the spear shaft 12 and the tip assembly 11 to permit deployment of the tip within the fish speared on the other side of the fish as will be assembled hereinbelow.

A rear cable restraint means 16 includes cable retainer ring 18 which is machined to provide a channel 19 into which O-ring 20 is received. By positioning ring 18 and the O-ring 20 close to retainer flange 21 as clearly shown in FIGS. 2-3 sufficient resistance is provided to hold cable 14 taut and to prevent tip assembly 11 from falling off shaft 12, when, for example, the spear 10 is pointed downwardly. The use of the O-ring 20 does not interfere with the release of the spear tip after the speared fish forcibly pulls onto the barb 22 of the tip assembly 11.

Flange 21 includes at least one longitudinal passageway 23 through which passes the rearward portion of cable 14.

Cable 14 is preferably formed of metal and ball 17 is formed by melting the ends of cable 14 in an inert atmosphere as understood in the art.

Figure 2:
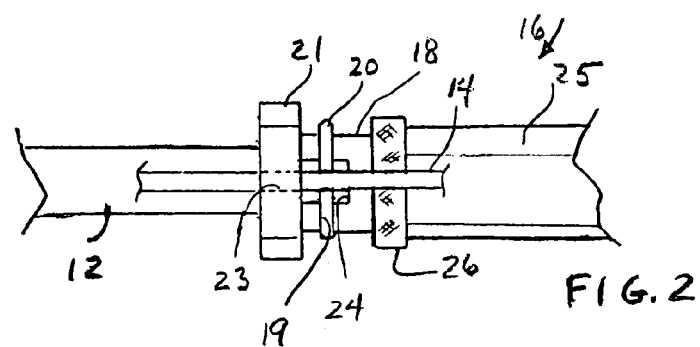
FIG. 2 is an enlarged side partial diagrammatic view of the improved spear gun tip assembly of FIG. 1.

FIG. 2 illustrates cable 14 passing through passageway 23 over O-ring 20. O-ring 20 is mounted in a groove 19 that positions a portion of the O-ring 20 over machined slot 24 in a first position allowing for the movement of such portion of the O-ring 20 downward thus reducing the friction/crimping engagement of the cable 14 and the upper surface of the O-ring 20.

Figure 3:
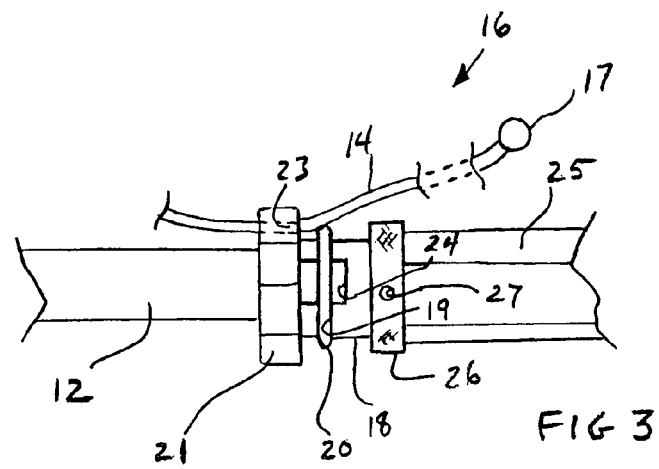
FIG. 3 illustrates the assembly of FIG. 2 rotated 90° about the longitudinal axis.

In FIG. 3, the cable retainer ring 18, which is integral with flange 26, is rotated to a second position to bend the cable 14 in a manner to engage the O-ring 20. The engagement between a portion of cable 14 and O-ring 20 prevents the tethered tip member 11 from falling off coupler 13 but does not impair operation of the spear 10 in a normal manner. Prior art devices employed a spring bias against flange 26/ring 18. In the present construction, a simple rotation of the flange 26 of as little as 90° results in engagement (FIG. 3) or easy release (FIG. 2), although a half-turn (180°) is preferred. Oil hole 27 provides a way of lubricating the rotating flange 26 internally.

The preferred cable release procedure involves rotation of flange 26. It is to be understood that rotation of flange 21 would accomplish the same result. The relative motion of the parts is the essence of the operation.

Barb 22 is constructed of substantially rigid nylon or other strong and similar materials suitable for a marine environment. The barb 22 can be mounted onto rearward portion of tip assembly 11 by any suitable means such as set screws (not shown) or through the use of a resilient inner surface that permits forcing it into position along the rearward end portion of tip member 11 to the proper position from the pointed end 15 thereof by slowly and forcibly pressing rearwardly on the front surface of body 29. An upper surface 28 of barb body 29 includes a longitudinal channel 30 aligned with a long axis of the shaft 12 that is sized to releasably accommodate a major cross-sectional portion of the cable 14 therein without inhibiting release therefrom as clearly shown. Keeping the cable taut and close to the tip member 11 and shaft 12 reduces the drag profile of the spear 10 and cable 14.

The barb 22 is rearwardly directed and divergent from the long axis of the spear and is an arcuate point 31 at the lower portion of body 32 as clearly shown in FIG. 1. The point 31 may be in any rotative position and is constructed to permit disconnection of the tip member 11 by a pulling force of a speared fish to position the tip member 11 transversely of the hole made in the fish by the tip member as contrasted with the barb action found with the barb action found with many conventional fish hooks.

Spear is attached to a spear gun (not shown) at rearward portion 25.

With respect again to FIG. 1, an improved tip is illustrated by front attachment fitting in the form of a crimped metal sleeve 33 affixed to cable 14 and includes a second barb 36 made of a length of cable 34 carried by sleeve 33 with a ball 35 formed on the end. The ball 35 and cable portion 34, located 180° away from barb 22, will engage either inside or outside of a fish to assist in releasing the tip 11. At this time, the barb 22 will then engage the fish and turns the tip 11 sideways to lock the spear tip 11 to the fish.

The spear gun tip assembly in accord with the present invention is designed for spear guns but can be used with a wide variety of spear fishing firing devices such as pole spears and Hawaiian slings or any other spear apparatus used for underwater spear fishing.

While the invention has been described with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what it is desired to secure by Letters Patent of the United States is:

1. A spear assembly for an underwater spear fishing device comprising an elongated shaft adapted to be fired from a spear gun and having a long axis, a forward portion, and a rearward portion, and a tip member having front and rear portions, said tip member being removably attached to said forward portion of said shaft, an elongated flexible cable with a forward end attached to said tip member and a rearward portion attached to said rearward portion of said shaft, a barb including a barb body attachable to said tip member adjacent said rear portion of said tip member and having a rearwardly directed barb point, rear cable restraint means on said shaft, said rear cable restraint means being rotatable to one position for providing resistance onto said cable to impede movement of said cable and said tip member until said spear is released from a spear fishing device; said rear cable restraint means including a retainer flange carried by said shaft and having a passageway therethrough for carrying said cable therein, a cable retainer ring including a slot formed in an outer surface of said cable retainer ring, a resilient O-ring carried on said retainer ring, a portion of said O-ring being positioned over said slot and being movable downwardly, a portion of said cable being threaded through said passageway in said retainer flange and over said O-ring, said slot being rotatably positionable with respect to said cable threaded through said passageway to said one position wherein said cable portion is overlaying a portion of said O-ring over said slot to allow for downward movement of said portion of said cable to allow free movement of said cable and another position wherein said cable portion is overlying a portion of said O-ring over said retainer ring spaced away from said slot for engagement of said portion of said cable to inhibit said tip member from disengaging from said shaft prior to releasing said shaft by a spear fishing device.

2. The spear assembly as defined in claim 1 wherein said tip member includes a rear portion releasably attachable to said forward portion of said shaft, a front portion having a sharpened tip, and a medial portion, said forward end portion of said cable being attached to said medial portion of said tip member.

3. The spear member as defined in claim 1 wherein said barb body is removably attached to said rear portion of said tip member.

4. The spear member as defined in claim 1 wherein said forward end of said cable includes a sleeve member affixed to said cable and another barb member carried by said sleeve member.

5. In a spear assembly as defined in claim 4 wherein said another barb member is positioned 180° away from said barb.

6. The spear member as defined in claim 1 wherein said barb point is directed downwardly for engaging a far side of a speared fish to effect relative movement between a fish and said shaft to forcibly release said tip member from said shaft.

7. The spear assembly as defined in claim 1 wherein said cable restraint means includes a long channel disposed in said barb body for retaining a portion of said cable therein, said long channel being parallel to said long axis.

8. The spear member as defined in claim 1 wherein said barb and said body are integral and are removably attached adjacent said rear portion of said tip member.

9. The spear assembly as defined in claim 1 further comprising securing means for attaching said barb to said rear end portion of said tip member, said securing means including said barb body surrounding said rear portion and carrying said barb at a predetermined location thereon.

10. The spear assembly as defined in claim 1 wherein said barb body includes a channel disposed about 180° from said predetermined location of said barb, said channel being elongate extending substantially parallel to said long axis of said shaft and adapted to receive a portion of said cable therein and maintained therein until a speared fish exerts a force on said barb thereby releasing said portion of said cable from said groove.

11. The spear assembly as defined in claim 1 wherein said barb has a first portion with a rearwardly directed arcuate point and a second portion approximately 180° opposed from a first portion and including a channel parallel to said long axis of said shaft for carrying a portion of said cable to reduce a drag profile of said cable.

12. A spear assembly for an underwater spear fishing device comprising an elongated shaft adapted to be released from a spear fishing device and having a long axis, a forward portion, and a rearward portion, and a tip member having front and rear portions, said tip member being removably attached to said forward portion of said shaft, an elongated flexible cable with a forward end attached to said tip member and a rearward portion attached to rearward portion of said shaft, a barb including a barb body attached to said tip member adjacent said rear portion of said tip member and having a rearwardly directed barb point, rear cable restraint means for impeding movement of said cable and said tip member until said spear is released from a spear fishing device, a retainer flange attached to said shaft and having a passageway therethrough for carrying said cable therein, a cable retainer ring including a slot formed in an outer surface of said cable retainer ring, a resilient O-ring carried on said retainer ring, a portion of said O-ring being positioned over said slot and being movable downwardly, a portion of said cable being threaded through said passageway in said retainer flange and over said O-ring, said slot being rotatably positionable with respect to said cable threaded through said passageway to a first position wherein said cable portion is overlaying a portion of said O-ring over said slot to allow for downward movement of said portion of said O-ring and a second position wherein said cable portion is overlying another portion of said O-ring over said retainer ring spaced away from said slot for engagement of said portion of said cable to inhibit said tip member from disengaging from said shaft prior to releasing said shaft by a spear fishing device.

13. The spear assembly as defined in claim 12 further comprising securing means for attaching said barb to said rear end portion of said tip member, said securing means including said barb body surrounding said rear portion and carrying said barb at a predetermined location thereon.

14. The spear assembly as defined in claim 13 wherein said barb body includes a channel disposed about 180° from said predetermined location of said barb, said channel being elongate extending substantially parallel to said long axis of said shaft and adapted to receive a portion of said cable therein and maintained therein until a speared fish exerts a force on said barb thereby releasing said portion of said cable from said groove.

15. The spear assembly as defined in claim 13 wherein said barb has a first portion with a rearwardly directed arcuate point and a second portion approximately 180° opposed from a first portion and including a channel parallel to said long axis of said shaft for carrying a portion of said cable to reduce a drag profile of said cable.

16. The spear assembly as defined in claim 12 wherein said forward end of said cable includes a sleeve member affixed to said cable and a second barb member carried by said sleeve member.

17. The spear assembly as defined in claim 12 wherein said tip member includes a rear portion releasably attachable to said forward portion of said shaft, a front portion having a sharpened tip, and a medial portion, said forward end portion of said cable being attached to said medial portion of said tip member.

18. The spear member as defined in claim 12 wherein said barb body is removably attached to said rear portion of said tip member.

* * * * *